United States Patent [19]
Stringer et al.

[11] Patent Number: 5,341,429
[45] Date of Patent: Aug. 23, 1994

[54] TRANSFORMATION OF EPHEMERAL MATERIAL

[75] Inventors: John W. Stringer, Santa Cruz; Theodore S. Richards, Los Gatos, both of Calif.

[73] Assignee: TestDrive Corporation, Santa Clara, Calif.

[21] Appl. No.: 986,105

[22] Filed: Dec. 4, 1992

[51] Int. Cl.⁵ .............................................. H04K 1/00
[52] U.S. Cl. .......................................... 380/23; 380/4; 380/25
[58] Field of Search ...................... 380/3, 4, 23, 24, 25, 380/49, 50

[56] References Cited

U.S. PATENT DOCUMENTS

| | | | |
|---|---|---|---|
| 4,646,234 | 2/1987 | Tolman et al. | 380/4 X |
| 4,658,055 | 8/1987 | Thomas | 380/4 X |
| 4,658,093 | 4/1987 | Hellman | 380/25 |
| 4,740,890 | 4/1988 | Willaim | 380/4 X |
| 4,888,798 | 12/1989 | Earnest | 380/4 |
| 5,014,234 | 5/1991 | Edwards, Jr. | 380/4 X |

Primary Examiner—Tod R. Swann
Attorney, Agent, or Firm—Michael A. Glenn

[57] ABSTRACT

A bidirectional process allows remote transformation of ephemeral materials between an original form and a denatured form without changing the content of the material from its original form and without restricting the resolution, functionality, and/or utility of the original material in the denatured form. The denatured material provides both a limited use form, which allows temporary full function evaluation of the material; and an enabled form, which allows unrestricted full function use of the material. A security system supervises conversion of the denatured material from the limited use form to the enabled form.

20 Claims, 4 Drawing Sheets

TRANSFORMATION OF EPHEMERAL MATERIAL

BACKGROUND OF THE INVENTION

1. Technical Field

The present invention relates to the manipulation and storage of information. More particularly, the present invention relates to securing information against unauthorized use while permitting time-limited and/or function-limited use and/or examination of the information.

2. Description of the Prior Art

Most expression and communication is reducible to one form or another of information. As information technologies become more and more sophisticated, information is increasingly being treated as a commercial commodity. For example, movies may be purchased or rented on video-tape; music is stored digitally on compact disks; computer programs are available on floppy disks; and data bases, including images and text, are readily available on CD-ROM, as well as from on-line services.

As with any commodity, it is easier for a potential purchaser to make a purchase decision if he or she is able to evaluate the information before making the decision. Because most information exists as ephemeral material, such as is stored electronically on a magnetic medium, or as is broadcast over the airwaves as an electronic signal, it is difficult for a vendor to secure the information against unauthorized use in its original form during a trial or evaluation period.

It would be beneficial to reconcile these conflicting concerns with regard to transactions involving such materials. That is, it would be helpful to a vendor of such materials if a potential purchaser were able to evaluate a secure, original version of the materials during a trial period. Because such materials are expensive to purchase but easy to copy illegally, it is common practice for a potential purchaser to obtain and evaluate an unlicensed copy of the materials. This allows the potential purchaser to avoid purchasing such materials at significant cost and then never use the materials because they do not meet the purchaser's needs. It also allows the potential purchaser to continue using an unlicensed copy of the materials after evaluation is completed, resulting in significant lost revenues to the vendor of the materials.

The various techniques that are known for securing evaluation versions of ephemeral materials are, overall, unacceptable to both a potential purchaser and the vendor. For example, such techniques require that the original author of the material devote significant time and energy to modifying such material to create a trial or evaluation version of the material. The vendor is then obligated to inventory and support nonrevenue producing versions of the vendor's products.

If, after a trial period, a user desires to purchase the material, it is not possible to employ a remote transaction to deliver such materials. Rather, the customer must place an order with the vendor and the product must be shipped to the customer from inventory. This series of transactions creates delays that may frustrate the customer, while adding significant overhead to the vendor's operations. Thus, it is not possible for a vendor to take full advantage of all possible material distribution channels. For example, when delivering pay-for-view and other entertainment media to a customer over a broadcast medium, it is not possible to deliver high-bandwidth evaluation versions of the material, and then provide an enabled, fully functional version of the material by means of a low-bandwidth transaction, e.g. over point-to-point channels, such as by telephone, at a conclusion of the trial period.

Accordingly, trial versions of such materials, such as software products and other forms of electronic data, are specially modified versions of the material that have intentionally limited functionality and that cannot be restored to their original state. Customers are encouraged to use the trial version of the material and then, if the customer wants to purchase a fully functional, unrestricted version of the material, the customer must order the standard material version. The trial version of the material is then discarded. Typically, such trial versions provide very limited functionality, such that the potential customer cannot get a realistic view of the product.

The following schemes comprise the state of the art with regard to providing trial and evaluation versions of ephemeral materials, such as electronic data:

A data access system provided by Enigma Logic of Concord, Calif. allows the evaluation of the full or standard version of a software program—the system does not work with data, such as images or sounds. A remote transaction is necessary to allow access to, or enabling of, the software product. Accordingly, the evaluated program cannot be converted locally to the standard, unmodified version of the program. The data access system allocates algorithm space to software authors, but includes software hooks in evaluation versions of the program. Such evaluation versions must be recompiled into special versions that incorporate the unique enabling programs. This requires special software or a unique operating system for implementation.

More problematic is the requirement that a separate password gate and hardware key is necessary to allow use of the system. Such scheme degrades both system operation and program performance by requiring the user to interrupt use of the program and respond to frequent validation calls to the password gate.

Lotus Software of Cambridge, Mass. provides an evaluation system that allows a user to evaluate a full or standard version of a software product that must be stored on a hard disk. The system requires remote confirmation before a user is allowed access to, or enabling of, the software product. The system also requires that a software author modify the original software to implement the evaluation scheme, such that the evaluation version must be recompiled before it can be enabled. The system additionally includes a routine that provides hardware copy protection.

"Trial Versions" of software are generally available. Such versions are often offered for free or for a nominal charge and provide some restricted utility of the software product, which allows a user a limited evaluation of the product. As with other evaluation schemes, this system requires that the software author modify the original product to produce the evaluation copy. If a user decides to purchase the product, the user cannot create a fully functional, full featured copy of the original product remotely, but must purchase another disk which contains an operational original version of the product.

Encrypted broadcasts are commonly used, for instance for Pay-Per-View showings of movies and other entertainment programming. Such system does not allow unrestricted viewing of a full original version of the program. Rather, the version of the program provided to a viewer is intended for one-time use. Thus, such system is not useful for most applications involving electronic data which require many-time use of programs, databases, art, music, etc.

Adobe of Mountain View, Calif. provides a CD-ROM-based evaluation system for printer fonts. This system requires a remote transaction to access a fully enabled version of the stored fonts. However, the system only allows viewing of the fonts on the user's screen. The computer system printer metrics are not provided in the trial or evaluation versions of the font. Thus, printing is possible only when the enabled version of the font is available. Accordingly, such a scheme, because it only allows viewing of the font on a screen, is of no practical value in evaluating the actual printed font on a page of paper.

Comstock of New York, N.Y. provides a library of stock photos on CD-ROM. The system allows viewing of a scanned digital version of a full original (i.e. a low resolution version), but does not allow for remote unlocking of the original. Rather, the system requires a separate transaction to obtain fully usable copies of the library photos.

Examples of other schemes for protecting ephemeral materials include:

DAT (Music Tape) copy protection;
Floppy Diskette copy protection;
Serial Port hardware keys;
Restricted number of copies of original;
"Try and Buy", i.e. specially developed trial versions of original materials that cannot be converted to originals, collected on a CD-ROM, e.g. MacWorld Resource CD.

The foregoing systems are of limited use and appeal because they require the author to modify the original material to produce the evaluation version of the material. As such systems provide a less than completely functional evaluation copy, a non-owner cannot evaluate the entire original material, for example in making a purchase decision. Should the decision be made to purchase the original, an entirely different copy of the material must be obtained, i.e. an evaluation copy of the material cannot, upon validation, be used as a fully functional original of the material.

There is not any known secure system available at this time that allows a user to view a data-based product, or use the product in its fully functional form before deciding to purchase the product, and that allows the user to restore the evaluation version of the product to its fully functional original version form immediately after the user decides to purchase the material.

SUMMARY OF THE INVENTION

The present invention provides a system for securing electronic data, while allowing time-limited and/or function limited use of the data. The invention converts an original version of the data to a disabled version that may be used for a limited trial or evaluation period. If purchase of the data is desired, an unlock code may be purchased that converts the data to its original state.

The preferred embodiment of the invention provides an apparatus and method for bidirectional transformation of ephemeral material. When the invention is applied to chosen materials, such as a computer program, a portion of the material is separated from the original material. In this way, the present invention produces a denatured version of the original material that includes the separated portion of the material and the residual portion of the material. The denatured version of the material is placed into a temporary storage medium, such as a random access memory in a computer system, such that the denatured version is readily accessed by a system user. Alternatively, the separated portion of the material may be replaced with a modified portion, for example a counter may be included to limit the number of times the material may be accessed, or interfering material may be added to the original material, such as beeps in an audio signal, or a mask in a visual signal.

The invention also provides a module that supervises recombination of the separated portion and the residual portion of the original material, as provided with the denatured version of the material, to allow time and/or function limited access to the original material. A transaction module enables unrestricted access to a fully functional copy of the original material by permanently recombining the separated portion and the residual portion of the original material on a permanent storage medium, such as a hard disk.

Accordingly, the present invention allows a user to evaluate fully functional versions of original materials before purchasing the materials. Because the invention operates with any original material, there is no need for the author of the material to modify the original material to create a trial or evaluation version of the material. Rather, the invention allows any individual to transform an original version of the material into an evaluation version without any special knowledge of the content of the original material.

The present invention supports remote transactions for delivery of the materials by allowing immediate access to an original of the material locally, once the material is selected for purchase. For example, if purchase is desired, the user may call a 1-800 telephone number and, upon providing a credit card number, obtain a special code to enable the trial version of the material.

Thus, the present invention takes full advantage of all appropriate distribution channels. For example, in one embodiment of the present invention, evaluation versions of computer software are preinstalled on a computer system. If, after evaluation, purchase of the software is desired, the system owner need only obtain an authorization code by telephone to unlock a fully functional original of the software.

The present invention also makes it possible to deliver high-bandwidth denatured versions of ephemeral materials over broadcast channels. According to this embodiment of the invention, an enabled version of the material may be delivered via low-bandwidth transaction over point-to-point channels. That is, the original material is delivered locally with a system and an authorization code is purchased to access the material if purchase is desired after evaluation.

DETAILED DESCRIPTION OF THE INVENTION

Figure 1:
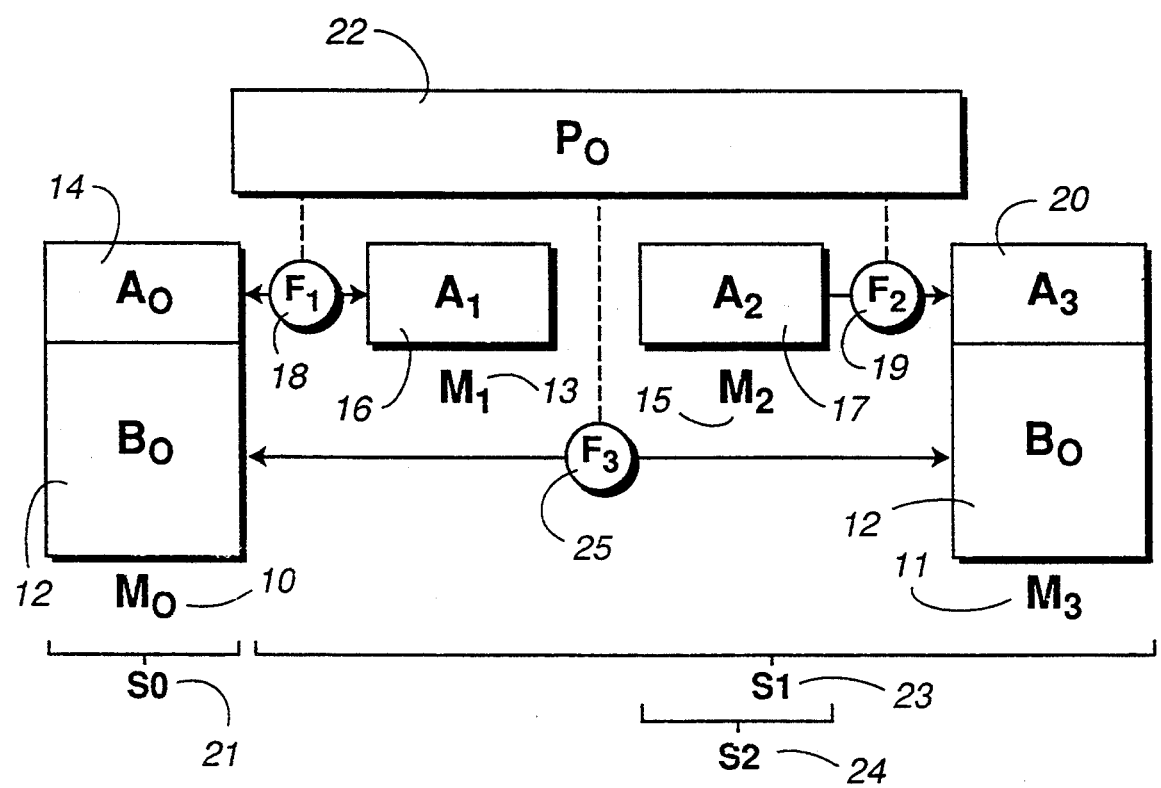
FIG. 1 is a block diagram of a system for transforming ephemeral matter according to a preferred embodiment of the present invention.

The present invention is best understood by referring to the Drawings in connection with review of this Description. The present invention provides a system for transforming ephemeral matter, such as electronic data, into a secure fully functional denatured version of the original matter. The present invention allows the denatured version of the original matter to be restored locally to its original form by means of an authorization sequence.

Definition of Terms

The following terms are used in the description as defined below:

"Author". Authors, composers, producers, or creators of original material who have access to components needed to build original material.

"Bi-directional process". Transformation of material from the original version to an evaluation version and back from the evaluation version to the original version without noticeable loss of information to the user. "Denatured". Partially or fully encrypted version of the original version.

"Enabled". Permanent conversion of denatured material to the original version.

"Ephemeral Material" (or "Materials"). Any material that can be duplicated via an electric device and saved and restored from an electronic storage medium, including, but not limited to, the permutations of digital, analog, magnetic, optical, disk, drum, and tape resident data.

"Evaluation". Partially disabled original version that allows full access to all of the original version's parts but restricts the use of one or more parts, either functionally and/or temporally. For example, allowing full access to all the features of a software program, but disallowing the ability to save and restore new work; or including beeps into sound source material, or blips of noise into video source material.

"Original". Ephemeral material which may be a software program, data file, sound or graphic file, etc., and that can be used independently of the transformation process.

"Remote [transaction]". Including, but not limited to, pressing a key, calling via telephone, fax or modem, exchanging legal tender or free tokens, and that engages a counter, clock, etc. to change the status of the trial period or trial condition.

"Third Party". Transforms original ephemeral material to its denatured version and wrapper and delivers both to user; does not need to be the author.

"Trial". Temporary conversion of: a denatured version to an evaluation version; an evaluation version to an original version; or a denatured version to an original version, for specific period of time.

"User". Neither a third party, nor an author; uses the trial, evaluation, and enabled versions of the ephemeral material; engages a transaction, either alone or in conjunction with a third party.

"Wrapper". Allows remote transaction to control bidirectional transformation between the original, evaluation, and trial versions of the material.

The preferred embodiment of the present invention converts and encrypts any desired software products using a "denaturing" process that replaces a portion of the product information, such as a standard version of an application program's "start-up" code, with a special portion, e.g. a special start-up code segment, that links the product to a usage counter and encrypts the application.

The enabling system of the present invention converts the application back to its "natural" state (file image), for example, by replacing the modified start-up code segment with the application's original start-up code.

FIG. 1 is a block diagram of a system for transforming ephemeral matter into a denatured version of the material according to a preferred embodiment of the present invention. In the Fig., a process P0 (22) uses various functions F1, F2, F3 (18,19,25) to make transformations of ephemeral materials M0,M1,M2, and M3 (10,13,15,11). The function F1 (18) takes a portion(s) A0 (14) of material M0 (10), optionally encrypts the portion A0 (14), and saves the portion as a processed portion A1 (16) which resides in material M1 (13). As a result of this operation, material M0 (10) exists as a residual portion B0 (12) and a separated or hidden portion A1 (14). When the present invention is applied to the denatured materials, the function F1 (18) takes the separated portion A1 (14) of the material M1 (13), optionally decrypts the portion A1 (14), and saves it as a portion A0 (14) of the material M0 (10).

Function F2 (19) mixes the portions A2 (17) of the material M2 (15), which can be any user generated additional material, such as ordering information, etc. or which can be portions of the hidden material A1 (16), into the portion A3 (20) of the material M3 (11). Function F3 (25) mixes the residual portion B0 (12) of the original material M0 (10) into the material M3 (11); or, in the other direction, the function F3 (25) mixes the portions B0 (12) of the material M3 (11) into the material M0 (10).

Thus, the set of original materials S0 (21) is transformed to an evaluation version of the materials S1 (23), which may optionally include third party generated materials S2 (24). The evaluation version of the materials includes the residual portion B0 (12) of the original material, third party generated materials A3 (20), and the separated or hidden portion A1 (16) of the original materials.

During evaluation, the residual portion B0 (12) and the hidden portion A1 (16) are recombined under the supervision of process P0 (22), which may be a shell program in some embodiments of the invention. Such recombination occurs in a temporary storage medium, such that the recombined version is not retained at the end of the current trial. Counters within process P0 (22) supervise the length of use or number of trials to which the evaluation materials are put.

The evaluation version is permanently enabled as part of a purchase transaction in which the process P0 (22), upon receiving and verifying an enable code, allows recombination of the residual portion B0 (12) and the hidden portion A1 (16) onto a permanent medium, such as a hard disk drive in a computer system.

In a preferred embodiment of the present invention, a third party may modify an original version of the material without author intervention, unlike prior art software methods that must be explicitly implemented by the software author. Such modification denatures the original version to produce a secure, fully functional trial or evaluation version of the material.

The present invention, does not require that the delivery medium be altered to implement the material in an original form, nor does the present invention require a specially prepared storage medium, such as is used for a CD-ROM based system. Thus, the preferred embodiment of the present invention allows a user to make a detailed assessment of the original materials in an original format. Because the trial or evaluation version of the material is functionally identical to the original version of the material, a trial use is substantially the same as using the original material. Accordingly, unlike the prior art, the present invention does not require both an evaluation version, in which key portions of the materials are missing or disabled, and an original version, which is separately ordered and delivered after evaluation is completed.

In the present invention, all material for transforming a denatured version of the material to the original version of the material, and therefore for enabling unrestricted, fully functional use of the material, is provided to the user with the evaluation (denatured) version. Until unrestricted use of the original version is authorized, for example by a valid purchase transaction, the material necessary to provide an original version is present on the same medium as the denatured version, but such material is unavailable to the user. Thus, the present invention provides a secure system which limits unauthorized access to the materials.

Transformation of the original material to an ephemeral version for trial or evaluation purposes in accordance with the present invention is possible with any ephemeral materials, e.g. computer programs, sound recordings, images, data, etc. In contrast, prior art software methods and techniques only work on executable code; prior art software algorithms only work on software data; etc. The present invention can be applied to any permutations of information stored as analog data, digital data, coded instructions, etc.

Figure 2:
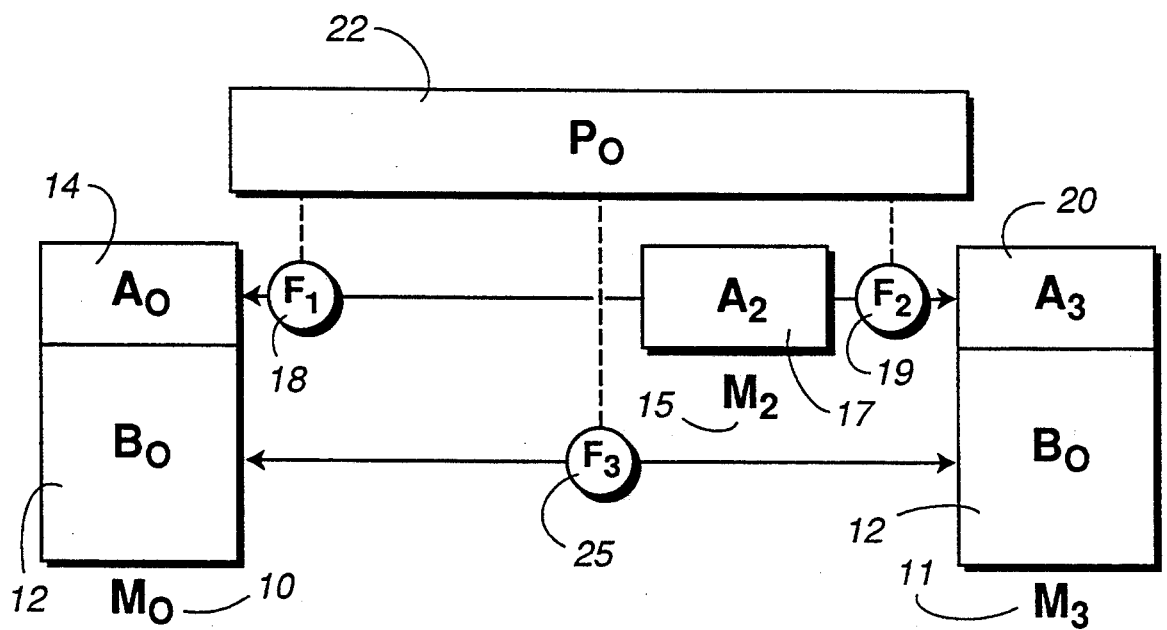
FIG. 2 is a block diagram of a system for transforming ephemeral matter according to an alternate embodiment of the present invention.

FIG. 2 is a block diagram of a system for transforming ephemeral matter according to an alternate embodiment of the present invention. The Fig. illustrates an aspect of the invention that allows varying of the size or reversibility of hidden and denaturing materials. For example, denaturing material M2 (15) could include a watermark or copyright motice that is inserted into the original material by function F2 (19). To remove the watermark or other material and enable unlimited use of the material, the denatured version of the original material is subjected, for example, to an exclusive-or operation with the denaturing material (either by function F1 or F2), or any other technique that would serve to erase the watermark from the original material.

In various embodiments of the invention, the portions A1 (16) and A2 (17), as shown in FIG. 1, can be of any selected size. Thus, FIG. 2 does not show a portion A1 (16), i.e. portion A1 (16) is of size "0". Portion A2 (17) is shown to be of a size greater than "0", such that appending or inserting portion A2 (17) into material M0 (10) creates a new material M3 (11) which is of lesser value than material M0 (10). As with FIG. 1, discussed above, evaluation or enabling of the denatured material M3 (11) reverses the process by which the original material was denatured, either in a temporary medium for evaluation purposes or in a permanent medium for enabling purposes.

Figure 3:
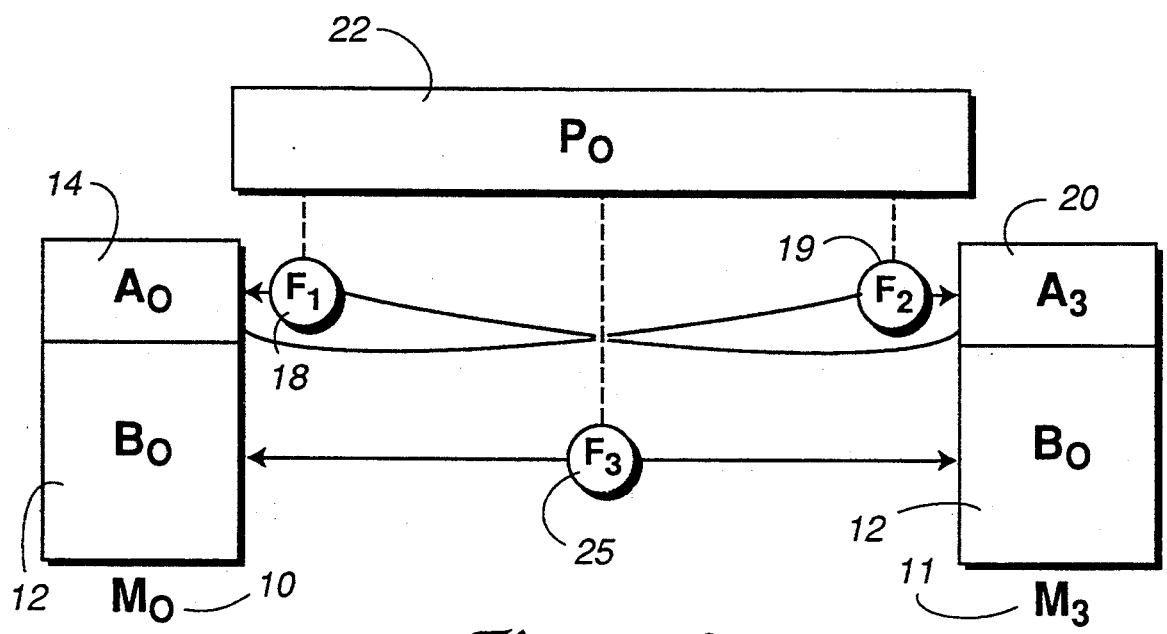
FIG. 3 is a block diagram of a system for transforming ephemeral matter according to another alternate embodiment of the present invention.

FIG. 3 is a block diagram of a system for transforming ephemeral matter according to another alternate embodiment of the present invention. FIG. 3 does not show a portion A1 or A2, i.e. portions A1 and A2 are of size "0". Thus, the transformation of portion A0 (14) to portion A3 (20) via function F2 (19) creates a new material M3 (11) which is of lesser value than material M0 (10). Function F1 (18) transforms portion A3 (20) back to portion A0 (14); both of functions F1 (18) and F2 (19) may be the same function if the transformation between portions A0 (14) and A3 (20) is reversible.

In both of FIGS. 2 and 3, the process P0 (22) becomes significant when there is enough differential in value between materials M3 (11) and M0 (10), to serve as an incentive to convert material M3 (11) back to material M0 (10).

Another embodiment of the invention interleaves the portions A0 (14) and B0 (12) in the material M0 (10), as well as interleaving the portions A2 (17) and B0 (12) in material M3 (11).

Denaturing process. When a third party invokes process P0 (22), a portion A0 (14) of original material M0 (10) is converted to portion A1 (16) by function F1 (18), and is saved as hidden material M1 (13). Process P0 (22) takes the remaining portion B0 (12) of original material M0 (10) and, by operation of function F2 (19), mixes it with a denaturing material A2 (17) to create denatured material M3 (11), consisting of portions A3 (20) and B0 (12), which is saved.

Enabling process. When a user invokes process P0 (22), the portion B0 (12) from denatured material M3 (11) is combined with the portion A1 (16), which is converted to portion A0 (14) of hidden material M1 (13), to create original material M0 (10), which is then saved in a permanent format.

Trial process. The trial process is nearly the same as the enabling process, except that original material M0 (10) is not saved. Instead, the generated original material M3 (11) is placed on a temporary medium, such as a random access memory in a computer system, and is automatically removed at the end of the trial period.

Figure 4:
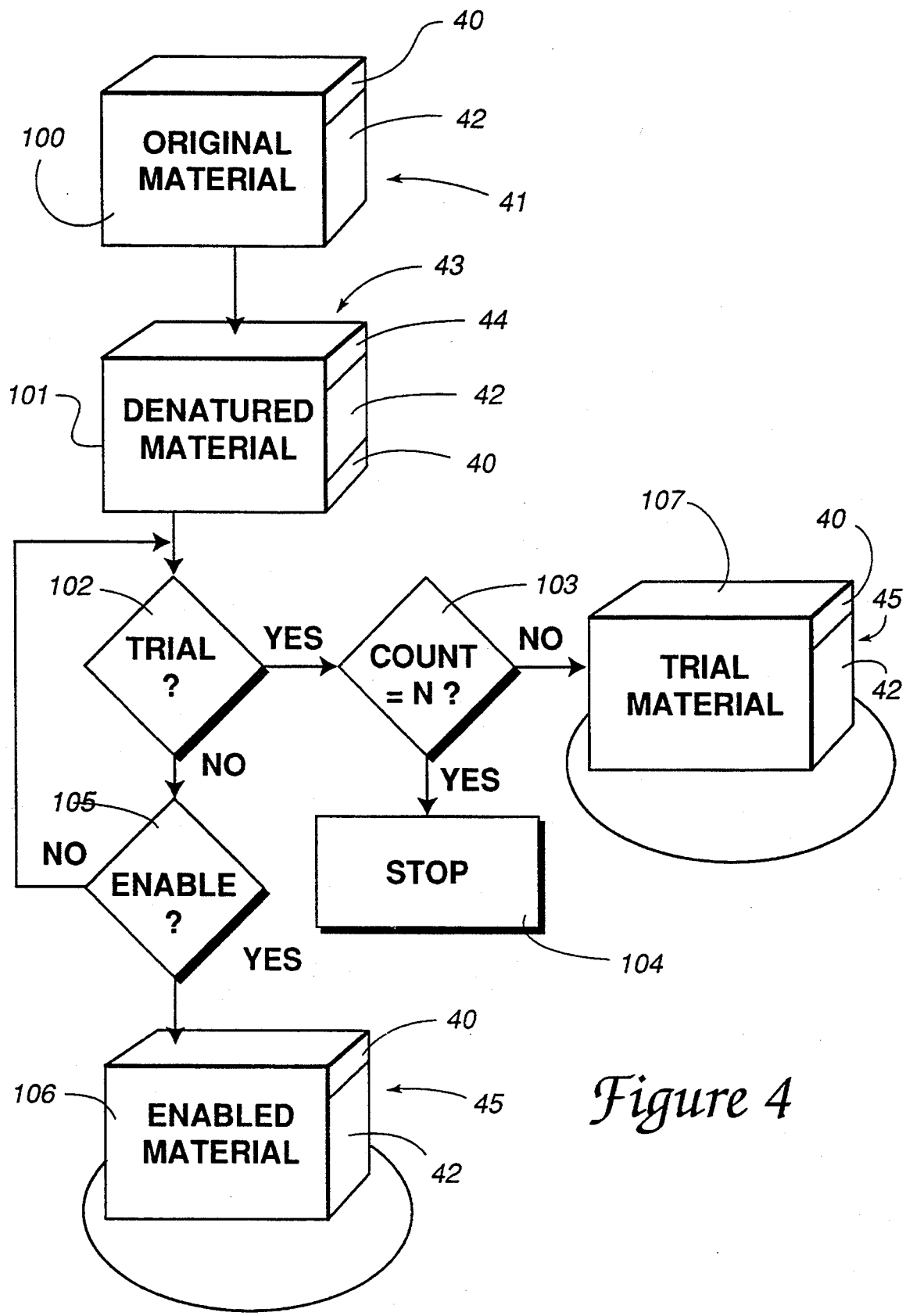
FIG. 4 is a flow chart depicting a process for transforming ephemeral matter between an original form and a denatured form according to a preferred embodiment of the present invention.

The foregoing is better understood with reference to FIG. 4, which is a flow chart depicting a process for transforming ephemeral matter between an original form and a denatured form according to a preferred embodiment of the present invention.

In the Fig., at the beginning of the process (100), an original application program file (41) has a startup code (40) and a residual portion (42), consisting of the rest of the code. Although the startup code is used in this embodiment of the invention for purposes of example, any section of the information may be separated from the whole in practicing the present invention.

The original material is disabled (101) by hiding the original startup code and replacing the startup code with a modified version (44), for example, a startup code that includes a counter that only allows a limited number of trial uses of the material. As a result, a denatured version (43) of the original material is produced.

During operation, a determination is made whether a trial use or an enable step is undertaken by a user (102). If the material is put to a trial or evaluation use (107), a counter is used to keep track of the number of uses (103). When a predetermined allotment of trial uses is exceeded, the material may no longer be used (104). If an enable is selected (105), the enable sequence is engaged.

When the material is enabled (106), the replacement startup code (44) is removed from the denatured version (43) and discarded, and the original startup code (40) is recombined with the residual material (42). As a result, an enabled version (45) of the original material is produced.

In some embodiments of the invention, the material may be modified to operate only in a temporary medium, such as a random access memory, during trial or evaluation. When enabled, the material is recombined on a permanent medium, such as a hard disk drive.

Security Strategy. The encrypted product appears as a special version developed by the publisher, although it is not a special version. Rather, a portion of the original material, e.g. the product's original start-up code, is hidden in another place. The denaturing process is a unique, check-summed operation using any of the many known encryption algorithms, such as the data encryption standard published by the U.S. government ("DES"). Thus, to enable the product, a special enable program must be activated by a unique, check summed code number.

Figure 5:
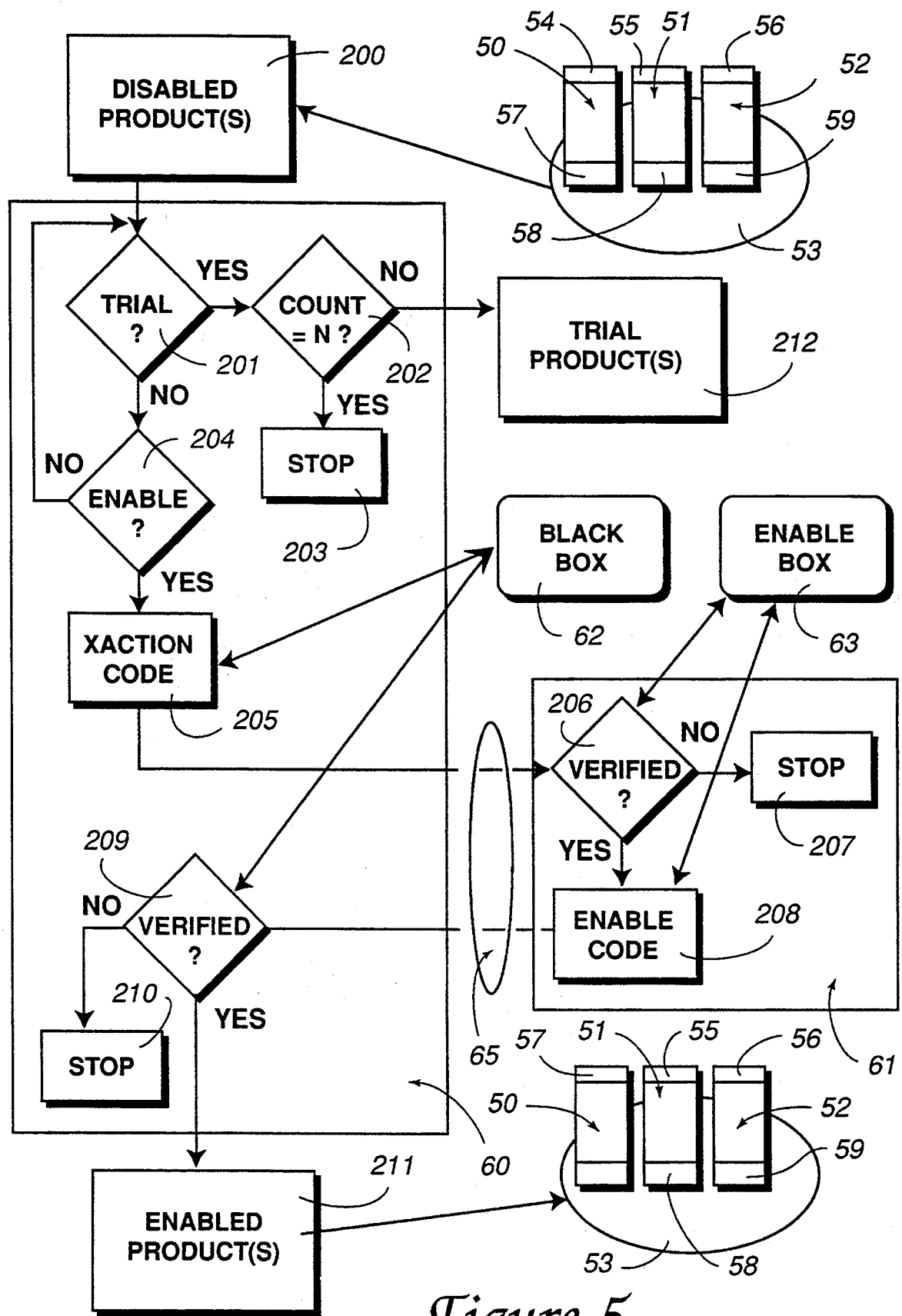
FIG. 5 is a flow chart depicting a process for enabling and restoring denatured ephemeral matter according to a preferred embodiment of the present invention.

FIG. 5 is a flow chart depicting a process for enabling and restoring denatured ephemeral matter according to a preferred embodiment of the present invention. In particular, FIG. 5 illustrates the preferred method of securing and enabling material in accordance with the present invention.

In FIG. 5, at a first step in the process (200), a storage medium 53 is shown having various disabled products (50,51,52) which include respective replacement start up codes (54,55,56) and hidden original start up codes (57,58,59), as described above in connection with FIG. 4.

A process shell (60) provides a counter and security function. A trial counter (201) keeps track of trial use (212) of each product and thus permits only a limited number of trials (202). When the count is achieved (e.g. "N"), indicating that the allowed number of trials have been used, additional trials are disabled (203).

If the product is to be enabled (204), then a transaction code is generated (205). When the original product is disabled, the product is given an identification method that a black box (62) uses to generate a unique product identification number for that product. The product identification number is displayed on the user's screen and is used as the transaction code when the user chooses to purchase the product. The black box provides a security code that may be generated by any of the known security and encryption algorithms.

The transaction code is given to a vendor sales representative at a remote location (61), e.g. over the telephone lines (65). The sales representative enters the product identification number into a master system "enable box" (63), where the number is verified as a valid "child" of the system "parent" (206). After validation, the "enable box" (63) issues a unique enabling code number (208) which is then provided to the user to enable the product. If the transaction code is not validated, the process is halted (207) and additional use of the product is disabled.

When the enable code is entered into the user's system, it is verified as a valid enable code (209). If the code fails the verification step, the process is halted (210) and additional use of the product is disabled. If the code is a valid enable code, the enabled products (211) are restored for unlimited or additional trial use. In the Fig., the product 50 is shown having its original startup code 57 restored; the replacement start up code 54 has been removed and discarded, as described above in connection with FIG. 4. Any number of products may be enabled as desired by this process, depending upon selection of the particular products by entry of the product's unique identification number.

The enabling code process is facilitated by a checksum technique, such as operates, for example, as follows: The user's system generates a product identification number that adds up to the same predetermined number, e.g. "10". The "black box" adds up any user number it receives and, if the number is equal to the predetermined number, then the "black box" validates the number. The "black box" then generates an enable number that always adds up to the same predetermined enable number, e.g. "15". When the user enters the enable number, the user's system checks the number and, if valid, enables the product.

In the security system of a preferred embodiment of the present invention, the system appears to a user to work with special "key" numbers generated at the time of installation. However, there is no inventory of enabling numbers. Rather, the customer ID number is unique and generated by the checksum algorithm that produces a different number for every transaction—in fact, the number can change from minute to minute, depending upon the specific implementation of the algorithm. Thus, the system generates unique enabling codes for every purchase session. Therefore, even if the "black box" were "captured" it still needs password activation (or daily system password) that expires every so many days or hours, to be replaced by a new password.

The following Examples are provided to illustrate a few of the many applications to which the present invention may be put. The Examples are therefore provided for purposes of example and are not intended to limit in any way the breadth of the invention.

EXAMPLE 1

Software "Try and Buy" system (see FIG. 1). In this embodiment of the invention, material M0 is the original executable code of a software application; material M1 is a portion of the application startup code; material M2 is a replacement startup code for the application which gives an error message and terminates program operation; and material M3 is a denatured file. When the software application is run without using the present invention (in this case, process P0), the application gives an error message and terminates program operation.

This embodiment of the present invention is used to distribute and sell software products directly to software purchasers. A computer system vendor provides a process incorporating the present invention on a hard drive supplied with the computer system, and/or the present invention may be distributed as part of a stand alone CD-ROM.

This embodiment of the invention offers a variety of "pre-installed" application and utility software programs. For example, an interactive, Windows-based graphics module system lets customers work with the software on a "trial" basis (e.g. up to ten uses); view an animated demonstration; compare the product's features; and receive information on special promotions and discounts. The customer can then call a 1-800 direct telephone number to reach the computer system vendor's sales office and purchase the product(s), for example by using a credit card. Upon credit approval, the sales representative gives the customer a special code number(s) that "unlocks" the software product(s) for unrestricted use. The supporting manuals and backup disks are sent via overnight express. Thus, the present invention provides a potential customer with the opportunity to purchase software on an informative, "try before you buy" basis.

This embodiment of the present invention provides enhanced value and allows personal configuration by pre-loading software, ready to try, on a computer system. If the customer is satisfied with the software, the customer can purchase the product, and convert it to unlimited ownership.

Thus, the present invention addresses the problems of purchasing materials, such as software. Because there are many products with hundreds of features, the present invention allows a user to actually try some of these products; see if the features they offer are useful; see how these features really work, all without requiring the user to purchase the product; or even order an evaluation copy of the product. If the customer decides to purchase a product, it is already installed on the customer's system and ready to use.

This embodiment of the present invention provides three system modules:

(1) A "Try and Buy" module which serves as the customer interface, providing a host of features and capabilities designed to facilitate the evaluation of the installed software products and the sale and enabling of the purchased products (for unlimited use).

(2) A master module which is installed onto the computer system hard drives, and which includes the "Try and Buy" module, encrypted software products, animated demos, price and promotion database and an enabling module.

(3) An enabling module which dispenses valid code numbers for the customer's local enabling system. This module provides a "black box" that validates the customer's I.D. number and issues the enabling codes that are integrated into a stand-alone Windows application.

A "Try and Buy" main program includes five program module windows:

1. Evaluate Product Module—Trial product and animated demos.

2. Compare Products Module—Compare products on a feature by feature basis.

3. Order Entry Module—1-800 sale and product activation.

4. Catalog Module—Information on additional products and services.

5. System Services Module—Erase system or products from hard drive.

General Operation: The "Try and Buy" system operates in a manner similar to that of a standard MS-Windows application. The "Main Module" functions as a dynamic, graphical "Main Menu," offering access to the five Program Module Windows.

The Evaluate Products Window displays "live" product icons that can be "launched" with either a simple mouse click or by typing the icon's "menu number." A dialog box appears whenever a product icon is launched, offering four simple choices: (1) View an Animated Demo; (3) Evaluate the Product; (3) Compare the Product; and (4) Purchase the Product.

The Compare Products Window provides customers with magazine-style comparison charts of products grouped within certain categories (word processing and spreadsheets) or a simple feature list of stand-alone products (no products available for comparison).

The Order Entry Window operates as an interactive order form that provides the customer with the following functions: (1) select the products they wish to purchase (or receive free); (2) review special pricing or promotion offers; (3) act as a "guide" for calling a 1-800 sales representative; and (4) provide an interface for entering the special product "enable code" that converts purchased products to unlimited use and ownership.

The Catalog Window is an interactive merchandising module (not a real, select products catalog) that displays information on additional product lines and services, such as "Notebooks," "Networks," and "Peripherals."

The System Services Window allows the customer to interactively select and de-select products and demos they would like to delete or retain within their system. This Window module appears as a dynamic "matrix" of products and demos that can be marked for deleting or saving. In addition, the customer has the option of deleting the entire "Try and Buy" system, e.g. to save space on the customer's system.

Operation and Module Specifications. In the preferred embodiment of the invention, the system is installed as the primary (and only) Windows 3.1 "Start Up" application. When the customer turns on their computer for the first time, "Try and Buy" system launches itself and may play a special animated introduction module.

The Compare Product Window offers the customer a quick method to compare similar products such as word processors on a feature by feature basis or simply review a "data sheet" of product features and benefits. A list of product comparison groups (word processors, spreadsheets, etc.) and any remaining "stand alone" products are displayed for selection by the customer.

The Order Entry Window operates as an interactive order form that provides the customer with the following functions: (1) select the products they wish to purchase (or receive free); (2) review special pricing or promotion offers; (3) act as a "guide" for calling the 1-800 sales representative and (4) provide an interface for entering the special product "enable code" that converts purchased products to unlimited use and ownership.

The Catalog Window is a "merchandised" information screen displaying information on the vendor's line of products and services and structured along the lines of an interactive marketing "demo." Several product category items are offered that can be selected for more information, such as "notebooks," "networks," and "peripherals." A single screen or a set of nested windows/or screens can be attached to each product category. Incentives for calling the vendor's 1-800 number could be offered, such as free catalogs, and special offers.

The Services Program Window provides the customer with simple a "matrix form" that allows the customer to delete all or portions of the "Try and Buy" system.

EXAMPLE 2

Graphic Image Try and Buy System (see FIG. 1). In this embodiment of the invention, material M0 is an original image; material M1 contains a portion of pixels that have been removed from the original image; material M2 provides a portion of pixels that are used in replacing the pixels removed from material M0 (i.e. material M2 provides a replacement for material M1); and material M3 is a resulting denatured image that is of good enough quality for evaluation purposes, but not for actual application.

EXAMPLE 3

Digital Audio "Try and Buy" system (see FIG. 2). In this embodiment of the invention, material M0 is the original audio material; material M2 is denaturing audio (e.g. periodic beeps, etc.) mixed into material M0 to create material M3. To denature the original material M0, function F2 uses third party added portion A2 to add portion A3 to material M3. The resulting material M3 is denatured audio that is of adequate quality for evaluation purposes, but not for regular listening. In fully enabled reproduction, function F1 uses portion A2 to remove the annoying beep. etc. introduced by portion A3 from material M3 and thereby recreate material M0. During trial reproduction and enabled reproduction, function F3 mixes the residual original material B0 into either material M3 (for trial reproduction) or material M0 (for enabled reproduction).

EXAMPLE 4

Analog audio tape "Try and Buy" system (see FIG. 3). In this embodiment of the invention, material M0 is the original tape; and material M3 is the denatured tape, which provides reproduction that is good enough for evaluation purposes. In this embodiment of the invention, function F3 denatures and/or enables the material via filters and amplifiers.

For example, in this embodiment of the invention, the audio signal is denatured such that the trial version of the audio signal, when reproduced, includes annoying sporadic drops in volume. In the denaturing process, a bandpass filter is used to gate a Schmitt trigger circuit. The Schmitt trigger circuit, in turn, is used to gate a voltage controlled amplifier (VCA). The VCA drops the amplitude of the source audio signal by 20 dB for a series of 20 millisecond intervals. The intervals are spaced sufficiently far apart to allow meaningful evaluation of the material, but not unrestricted enjoyment of the material.

The enabling process uses the bandpass filter to gate the Schmitt trigger. The Schmitt trigger, in turn, is used to gate the voltage controlled amplifier (VCA), which in turn boosts the amplitude of the source audio signal by 20 dB for a series of 20 millisecond intervals that correspond to the intervals during which the signal amplitude was reduced during the denaturing process. It has been found that, if close component tolerances are maintained, the enabled version of the audio signal is virtually indistinguishable from the original version of the audio signal.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. An apparatus for transformation of ephemeral materials, comprising:

a denaturing module for separating a portion of original material from said original material to produce a denatured version of the original material that is functionally identical to the original material, said denatured version including said separated portion and a residual portion of said original material, wherein said separated portion and said residual portion of said original material are physically stored on the same medium.

2. The apparatus of claim 1, further comprising:
a trial module for supervising recombination of said separated portion with said residual portion of said original material to allow limited access to said original material.

3. The apparatus of claim 1, further comprising:
a transaction module for enabling fully functional access to said original material by recombining said separated portion and said residual portion of said original material.

4. The apparatus of claim 2, said trial module including a counter for limiting use of the original material.

5. The apparatus of claim 1, wherein said denaturing module hides said separated portion of said original material, and wherein said denaturing module generates a denatured portion of said original material which replaces said separated portion of said original material.

6. The apparatus of claim 5, wherein said denatured portion is an altered version of said separated portion.

7. The apparatus of claim 3, wherein said transaction module further comprises:
a transaction code generator which provides a unique identifying code for said material to a remote transaction location; and
an enable code verifier which receives and validates an enable code provided by said remote transaction location in response to said identifying code; said enable code verifier enabling fully functional access to said original material in response to a verified enable code.

8. An apparatus for transformation of ephemeral materials, in which a portion of original material has been separated from said original material to produce a denatured version of the original material that is functionally identical to the original material, said denatured version including at least said separated portion and a residual portion of said original material, comprising:
a trial module for supervising recombination of said separated portion with said residual portion of said original material to allow limited access to said original material; and
a transaction module for enabling unrestricted access to said original material by recombining said separated portion and said residual portion of said original material.

9. A process for bidirectional transformation of ephemeral materials, comprising the step of:
separating a portion of original material from said original material to produce a denatured version of the original material that is functionally identical to the original material, said denatured version including said separated portion and a residual portion of said original material, wherein said separated portion and said residual portion of said original material are physically stored on the same medium.

10. The process of claim 9, further comprising the step of:

supervising recombination of said separated portion with said residual portion of said original material to allow to said original material.

11. The process of claim 9, further comprising the step of:
enabling fully functional access to said original material by recombining said separated portion and said residual portion of said original material.

12. The process of claim 10, further comprising the step of:
limiting use of the original material.

13. The process of claim 9, further comprising the steps of:
hiding said separated portion of said original material; and
generating a denatured portion of said original material which replaces said separated portion of said original material.

14. The process of claim 13, wherein said denatured portion is an altered version of said separated portion.

15. The process of claim 11, further comprising the steps of:
providing a unique identifying code for said original material to a remote transaction location; and
receiving and validating an enable code provided by said remote transaction location in response to said identifying code, thereby enabling fully functional access to said original material in response to a verified enable code.

16. A process for bidirectional transformation of ephemeral materials, in which a portion of original material from said original material to produce a denatured version of the original material that is functionally identical to the original material, said denatured version including at least said separated portion and a residual portion of said original material, comprising the steps of:
supervising recombination of said separated portion with said residual portion of said original material to allow limited access to said original material; and
enabling unrestricted access to said original material by recombining said separated portion and said residual portion of said original material.

17. The process of claim 16, further comprising the step of:
limiting use of the original material.

18. The process of claim 16, further comprising the steps of:
hiding said separated portion of said original material; and
generating a denatured portion of said original material which replaces said separated portion of said original material.

19. The process of claim 18, wherein said denatured portion is an altered version of said separated portion.

20. The process of claim 16, further comprising the steps of:
providing a unique identifying code for said original material to a remote transaction location; and
receiving and validating an enable code provided by said remote transaction location in response to said identifying code, thereby enabling unrestricted access to said original material in response to a verified enable code.

* * * * *